US012423732B2

(12) United States Patent
Oldroyd (10) Patent No.: US 12,423,732 B2
(45) Date of Patent: Sep. 23, 2025

(54) ARTIFICIAL INTELLIGENCE MODELS ADAPTED FOR ADVERTISING (71) Applicant: John Hiram Oldroyd, Kaysville, UT (US)

(72) Inventor: John Hiram Oldroyd, Kaysville, UT (US)

(*) Notice: Subject to any disclaimer, the term of this patent is extended or adjusted under 35 U.S.C. 154(b) by 0 days.

(21) Appl. No.: 18/623,514

(22) Filed: Apr. 1, 2024

(65) Prior Publication Data
US 2024/0330988 A1 Oct. 3, 2024

Related U.S. Application Data (60) Provisional application No. 63/455,677, filed on Mar. 30, 2023.

(51) Int. Cl.
G06Q 30/02 (2023.01)
G06Q 30/0241 (2023.01)
G06Q 30/0251 (2023.01)

(52) U.S. Cl.
CPC ..... *G06Q 30/0276* (2013.01); *G06Q 30/0256* (2013.01)

(58) Field of Classification Search
CPC .............. G06Q 30/0276; G06Q 30/0256
See application file for complete search history.

(56) References Cited

U.S. PATENT DOCUMENTS

| 10,672,035 | B1* | 6/2020 | Holtan | G06Q 30/0244 |
| 2019/0228439 | A1* | 7/2019 | Anthony | G06Q 30/0271 |
| 2023/0103638 | A1* | 4/2023 | Saharia | G06V 10/454 |
| | | | | 382/155 |
| 2024/0169500 | A1* | 5/2024 | Zheng | G06T 5/77 |

OTHER PUBLICATIONS

Mei, S., "U-Nets as Belief Propagation: Efficient Classification, Denoising, and Diffusion in Generative Hierarchical Models", 2024. doi:10.48550/arXiv.2404.18444. (Year: 2024).*

* cited by examiner

*Primary Examiner* — Waseem Ashraf
*Assistant Examiner* — Christopher C Busch
(74) *Attorney, Agent, or Firm* — John Oldroyd; Kirton McConkie (57) ABSTRACT Systems and methods of advertising in connection with AI systems and models, such as generative AI, in which user content is received from a user, advertiser content is received from an advertiser, and the AI system generates output influenced by both the user content and the advertiser content, and the resulting output is made available to the user.

5 Claims, 7 Drawing Sheets

ARTIFICIAL INTELLIGENCE MODELS ADAPTED FOR ADVERTISING

RELATED APPLICATIONS

This application claims priority to provisional patent application No. 63/455,677, filed Mar. 30, 2023, titled SYSTEMS AND METHODS OF ADVERTISING IN CONNECTION WITH ARTIFICIAL INTELLIGENCE MODELS, which is incorporated by reference herein in its entirety.

BACKGROUND OF THE INVENTION

Field of the Invention

The present invention relates to artificial intelligence models, and more particularly to models configured to provide more effective advertising.

Background and Related Art

Artificial intelligence models ("AI models") can provide a wide variety of benefits. For example, they can generate an image using a text prompt, or generate text in response to a question. These capabilities allow AI models to function as powerful assistants for creative processes.

There are many different types of artificial intelligence. For example, machine learning is a technique in which an AI system learns and improves its performance based on data input. The system is trained on a large amount of data and can then identify patterns and make predictions based on new data. Examples of applications that use machine learning include recommender systems, fraud detection, and image recognition. Another type of artificial intelligence is "deep learning." Deep learning is a subfield of machine learning that uses artificial neural networks with many layers to learn and improve performance. It is particularly useful for processing large amounts of data, such as images or speech, and has been used in applications such as natural language processing, speech recognition, and image recognition. Neural networks are a type of machine learning that are designed to simulate the way the human brain works. They are composed of layers of interconnected nodes, and each node performs a simple function. Neural networks can be used for a wide range of tasks, such as classification, regression, and prediction. Another field of AI is Natural Language Processing (NLP). NLP is a field of AI that deals with the interaction between computers and humans using natural language. NLP enables computers to understand, interpret, and generate human language. Examples of NLP applications include language translation, sentiment analysis, and chatbots.

Current AI models, such as those listed above, have many prospects for profitability. For example, NLP-based models can generate business advice, give financial counsel, and otherwise provide ideas for generated profit. Some machine-learning systems can generate images with artistic value, which may then be sold, licensed, or otherwise exploited for financial gain. Notwithstanding the foregoing, advertising in connection with AI models is an area of AI that has not been thoroughly explored.

For these reasons, there are significant limitations to the current technology in the AI industry. These limitations remain unaddressed and limit the profitability of AI models. The present invention addresses and overcomes these limitations.

BRIEF SUMMARY OF THE INVENTION

The instant systems and methods include a variety of AI models adapted for improved advertising, along with methods of advertising in connection with AI models. The AI models involved typically include models configured to generate content, such as text, images, audio, or other content.

According to some implementations, the systems and methods include an AI model configured to do any of the following, or a method for using an AI model to do any of the following:

Some implementations include displaying an advertisement to a user before displaying AI-generated results to the user. This can be after the user enters a prompt, or before the user enters a prompt. This can be while the user is waiting for results. This can be after the user receives results, but before the user enters the next prompt.

Some implementations include displaying advertisements to a user at the user's request, subsequently granting the user "credits" in exchange for viewing the advertisements, which credits can then be used to generate AI content. For example, the user can click a button to view an ad, after which the user will receive credits. In some implementations, the user has to use the AI system to generate ads in order to get credits. For example, the AI model may display text (or otherwise output information to a user) providing instructions (e.g., "to receive 5 credits, please create an image using the following prompt from our sponsor: 'A Cheesy Burrito Crunch.'") Upon entering the prompt and viewing the generated content, the user receives the credits.

Some implementations include returning advertisements alongside AI-generated results. For example, an AI system may return a number of AI-generated images (in response to a prompt), alongside a pre-made advertisement incorporated among the results. In some implementations, the advertisement is designated as an advertisement, to avoid confusing users. In some embodiments, the advertisement is AI-generated or contains AI-generated elements. In such embodiments, the advertisement may be designated as an AI-generated ad.

Some implementations include incorporating an advertisement into an AI-generated result, or incorporating an AI-generated result into an advertisement.

Some implementations include displaying one or more advertisements on a screen (or otherwise outputting such advertisements, such as through audio output or other visual output). When the user enters a prompt, in addition to being provided with normal output, the model modifies the advertisements to incorporate information from the prompt. For example, the advertisements can be placed in the style of digital art, or they can be modified to include an element of the prompt (e.g., if the prompt includes a monkey, the advertisement can be modified to include a money holding the advertised product). In some embodiments, the prompt can be analyzed by separate functionality of the AI model to determine an effective prompt-related modification to make to the advertisement.

Some implementations include analyzing the prompt through a text-generative aspect of the AI model and generating a new prompt for modification of the advertisement, resulting in a more effective advertisement.

Some implementations include providing a user with a challenge to attempt to cause a generative AI tool to recreate an ad as closely as possible. The user can be assigned a score based on an electronic analysis of how closely the generated image resembles the ad.

According to some implementations, AI-generated responses having an advertising component also include an indicator showing that the generated content is sponsored. In some implementations, the indicator shows a score indicating what percentage of the content is sponsored. In some implementations, the indicator shows how similar the generated content is to the sponsored content.

According to some implementations, the system allows for multiple users to provide input to a system simultaneously, and the system will provide output incorporating the input from each of the users.

According to some implementations, the system selects from a variety of possible advertisements and provides one or more based on certain criteria, such as similarity to the generated content, similarity to the prompt, and likely interest to the user based on the prompt.

According to some implementations, the system analyzes the prompt to generate an advertisement based on the likely interests of the user.

According to some implementations, one or more advertisements is adapted based on the prompt provided by the user.

According to some implementations, only a portion of an image is adapted. For example, a portion of an image generated by a prompt is adapted to contain an advertisement. As another example, a portion of an ad can be configured to be adapted based on the user's prompt. A label of a product, for instance, is adapted in some implementations to reflect the prompt of a user.

In some implementations, a portion of a product such as a design on a t-shirt, mug, or keychain can incorporate an AI-generated image. In some implementations, users are provided with an opportunity to purchase the product, which can be printed on demand.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

The instant invention includes a variety of systems and methods of advertising in connection with AI models that generate content, such as text, image, or audio content. The Figures illustrate certain embodiments as discussed below, but there are many possible iterations of the invention, and the figures do not show exhaustive combinations of the various possibilities as discussed herein. Any of the embodiments shown in the figures or discussed herein may be used in connection with any other embodiments.

Figure 1:
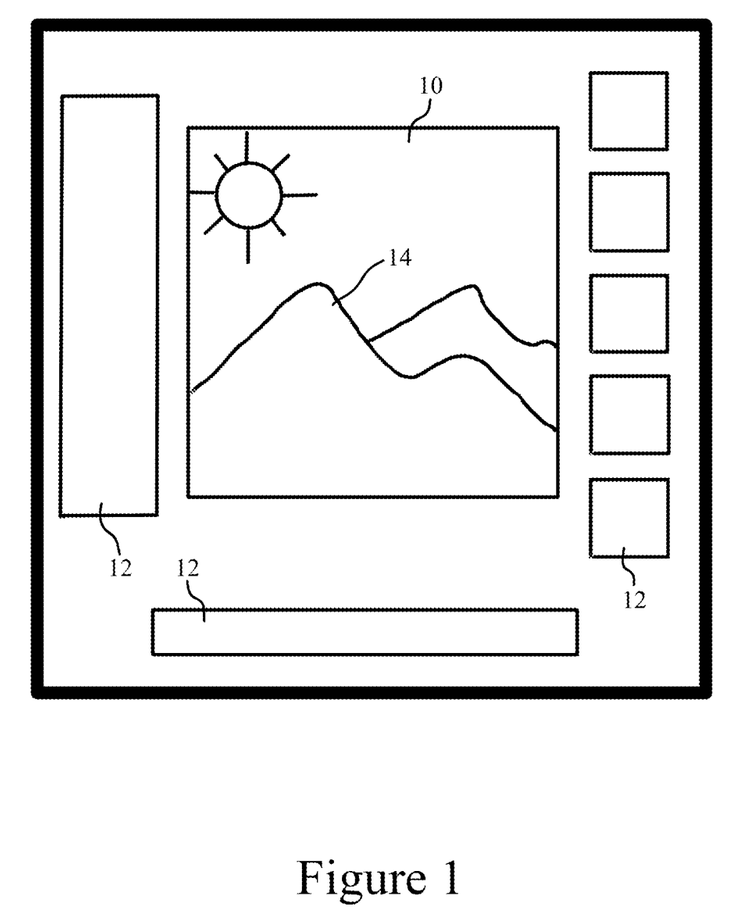
FIG. 1 illustrates a display showing AI-generated scenery as an output, in accordance with representative embodiments of the present systems and methods.

As shown in FIG. 1, some embodiments of the systems and methods disclosed herein are configured to provide user-requested output in response to input (e.g., an image, text, instructions, selected settings, or other input) received from a user. In some embodiments, all or part of the output is conveyed to a user through a primary modality 10 (e.g., an output window of a graphic user interface (GUI) for displaying images, videos, text, or other visual information, or for playing audio or other non-visual output). In some embodiments, all or part of the output is conveyed to the user through one or more secondary modalities 12. Like the primary modality 10, secondary modalities 12 can include one or more output modalities. Secondary modalities 12 can also include one or more input modalities. Input modalities can include windows, prompts, settings, or other elements configured to receive user input. User input can include videos, images, audio, text, instructions, prompts, setting adjustments, or any other input. In some embodiments, the user-requested output includes one or more user-requested elements 14, which is some cases are determined based on input provided by a user.

Figure 2:
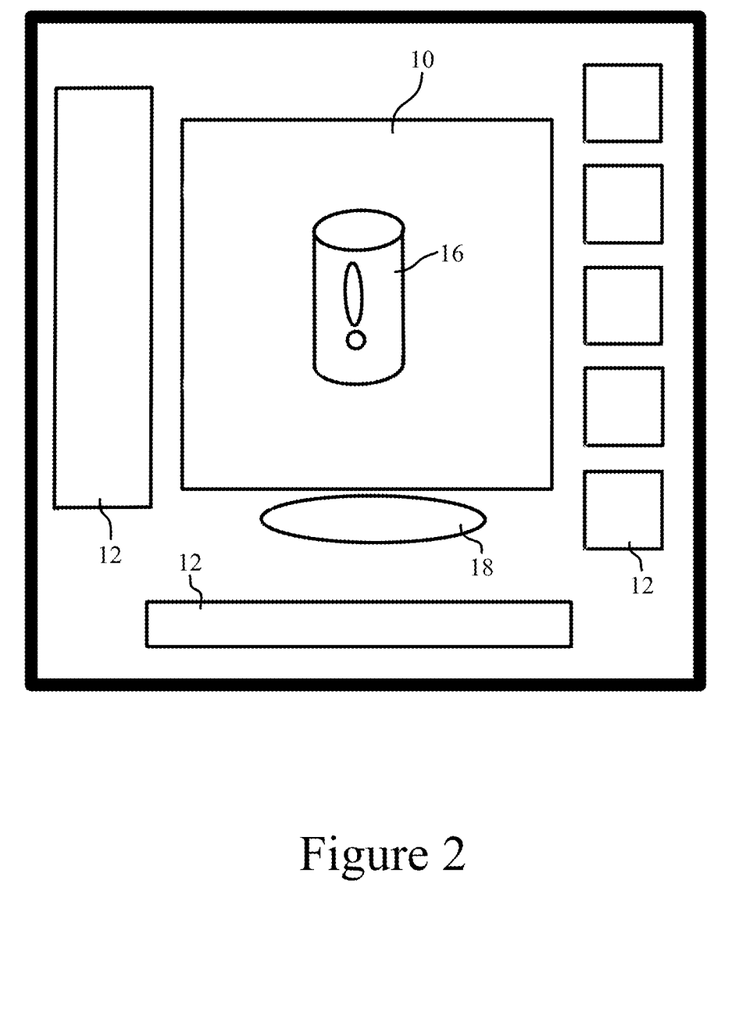
FIG. 2 illustrates a display showing an advertisement displayed to users, in accordance with representative embodiments.

As shown in FIG. 2, some embodiments are configured to provide advertiser-requested output to a user in response to input received from an advertiser. Again, the output can be provided through one or more primary modalities 10 or one or more secondary modalities 12. In some cases, the output includes one or more advertiser-requested elements 16, determined based on input provided by the advertiser. In some embodiments, the system is configured to provide an advertiser with options that are not presented to a user (e.g., relating to configuration of advertisements). Thus, in some embodiments, advertisers have the capacity to regulate both advertiser and user content through adjusting input, while users have only the capacity to regulate user content. This notwithstanding, in some cases, advertisers do not have the capacity to change the user content, or the advertisers have only limited capacity to do so. In some cases, users have the option to regulate the advertisement content (e.g., by disabling or changing it). In some cases, this additional functionality is only available to certain users (e.g., premium subscription users). Some embodiments that display advertiser-requested content 16 also include an indicator 18 such as a notice, a watermark, or another type of indicator, which indicates that the output includes advertiser-requested content 16. By way of non-limiting illustration, the indicator may include text stating: "content sponsored by X Corp."

Figure 3:
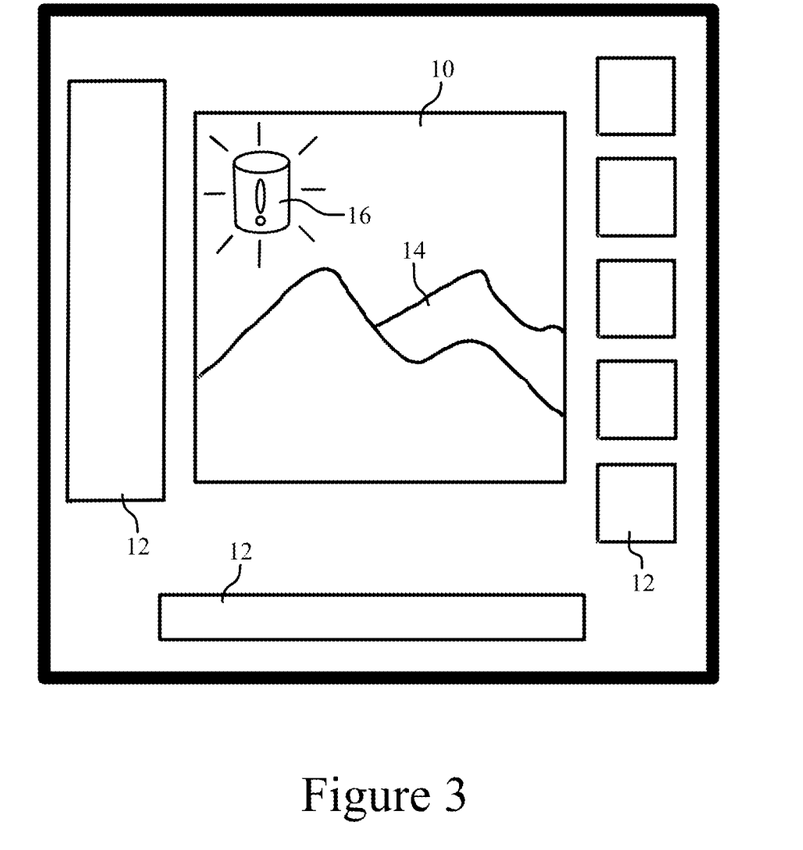
FIG. 3 illustrates a display showing various images containing different iterations of AI-generated scenery as an output, alongside an advertisement in accordance with representative embodiments.

As shown in FIG. 3, some embodiments are configured to incorporate advertiser-requested content 16 into user-requested content 14. In some cases, advertisers have the ability to determine when, how, and to what extent their content will be incorporated into user content.

Figure 4:
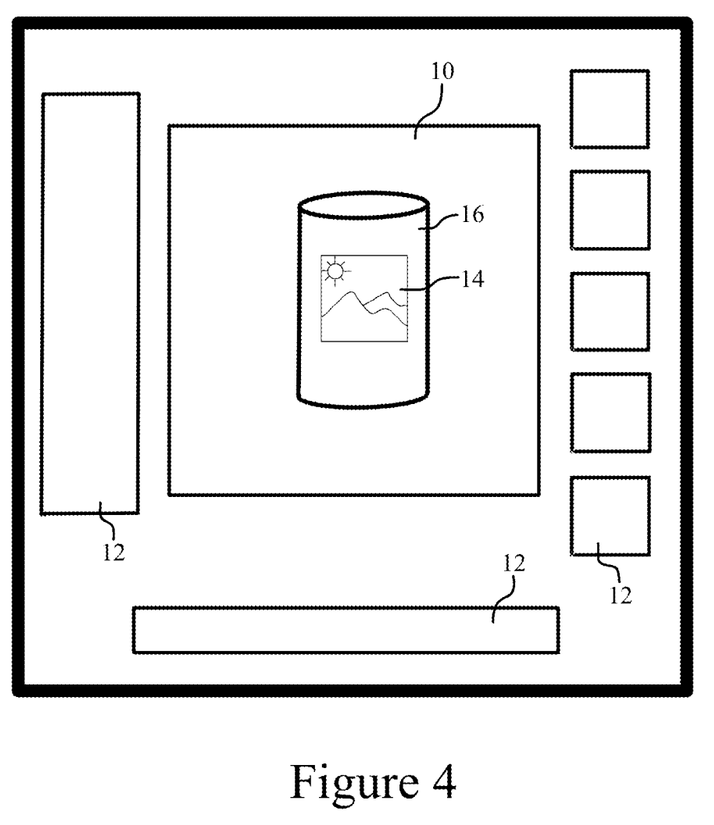
FIG. 4 illustrates a display showing AI-generated scenery integrated into an advertisement, in accordance with representative embodiments.

Similarly, as shown in FIG. 4, some embodiments are configured to incorporate user-requested content 14 into advertiser-requested content. Once again, some embodiments of the system enable the advertiser to configure any parameters of the advertisement's presentation (as discussed in more detail below).

Figure 5:
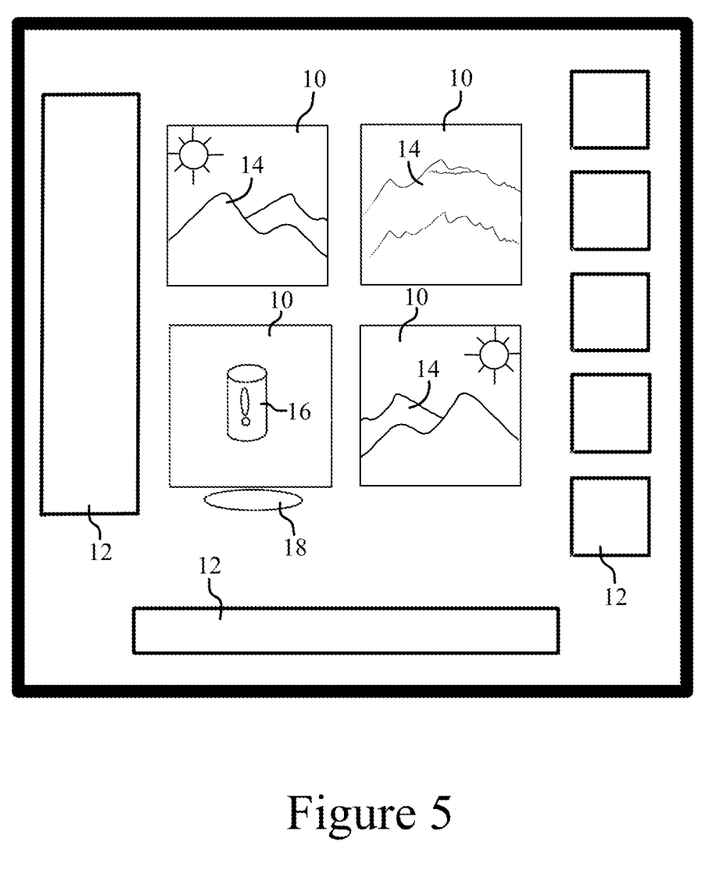
FIG. 5 illustrates a display showing an advertisement integrated into AI-generated scenery, in accordance with representative embodiments.

As shown in FIG. 5, some embodiments have multiple primary modalities 10, such as output windows configured to output various variations of generated content in accordance with a user's (or an advertiser's) request. Each of these primary modalities may be configured to output a different type of output (e.g., any of the output discussed in connection with FIGS. 1-4, or as otherwise discussed herein).

Figure 6:
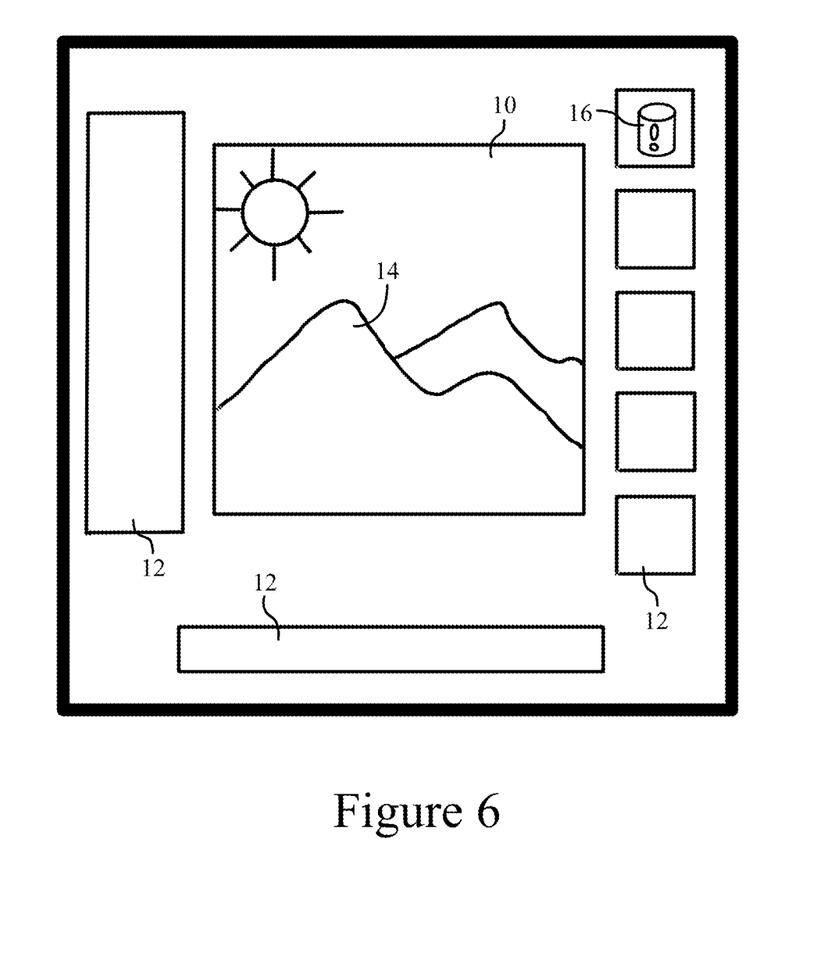
FIG. 6 illustrates a display showing AI-generated scenery, with an advertisement occupying another portion of the display, in accordance with representative embodiments.

As shown in FIG. 6, some embodiments have secondary modalities 12 configured to output advertisements or other content alongside the primary modality 10. For example, an advertisement (such as an advertisement configured to be modified based on a prompt by a user) may be displayed alongside pure user-requested content.

Relating generally to FIGS. 1-6, according to some embodiments, the AI models of the systems herein are configured to perform any of the following:

Some embodiments include displaying an advertisement to a user before displaying AI-generated results to the user. This can be after the user enters a prompt, or before the user enters a prompt. This can be while the user is waiting for results. This can be after the user receives results, but before the user enters the next prompt.

Some embodiments include displaying advertisements to a user at the user's request, subsequently granting the user "credits" in exchange for viewing the advertisements, which credits can then be used to generate AI content. For example, the user can click a button to view an ad, after which the user will receive credits. In some implementations, the user has to use the AI system to generate ads in order to get credits. For example, the AI model may display text (or otherwise output information to a user) providing instructions (e.g., "to receive 5 credits, please create an image using the following prompt from our sponsor: 'A Cheesy Burrito Crunch.'" Upon entering the prompt and viewing the generated content, the user receives the credits.

Some embodiments return advertisements alongside AI-generated results. For example, an AI system may return a number of AI-generated images (in response to a prompt), alongside a pre-made advertisement incorporated among the results. In some embodiments, the advertisement is designated as an advertisement, to avoid confusing users. In some embodiments, the advertisement is AI-generated or contains AI-generated elements. In such embodiments, the advertisement may be designated as an AI-generated ad.

According to some embodiments, an advertisement is incorporated into the AI-generated result. In some implementations, the AI-generated result is incorporated into the advertisement.

In some embodiments, one or more advertisements is displayed on a screen. When the user enters a prompt, in addition to being provided with normal output, the advertisements are modified to incorporate information from the prompt. For example, the advertisements can be placed in the style of digital art (or another style specified by a user), or they can be modified to include an element of the prompt (e.g., if the prompt includes a monkey, the advertisement can be modified to include a money holding the advertised product). In some embodiments, the prompt can be analyzed by AI to determine an effective prompt-related modification to make to the advertisement.

In some embodiments, text-generative AI can analyze the prompt to generate a new prompt for modification of the advertisement, resulting in the most effective advertisement.

In some embodiments, the user is provided with a challenge to attempt to cause a generative AI tool to recreate an ad as closely as possible. The user can be assigned a score based on an electronic analysis of how closely the generated image resembles the ad.

According to some embodiments, AI-generated responses having an advertising component also include an indicator showing that the generated content is sponsored. In some implementations, the indicator shows a score indicating what percentage of the content is sponsored. In some embodiments, the indicator shows how similar the generated content is to the sponsored content.

According to some embodiments, the system allows for multiple users to provide input to a system simultaneously, and the system will provide output incorporating the input from both users.

According to some embodiments, the system selects from a variety of possible advertisements and provides one or more based on certain criteria, such as similarity to the generated content, similarity to the prompt, likely interest to the user based on the prompt.

According to some embodiments, the system analyzes the prompt to generate an advertisement based on the likely interests of the user.

According to some embodiments, one or more advertisements is adapted based on the prompt provided by the user. According to some embodiments, a prompt by the user is adapted based on instructions provided by an advertiser.

According to some embodiments, only a portion of an image is adapted. For example, a portion of an image generated by a prompt is adapted to contain an advertisement. As another example, a portion of an ad can be configured to be adapted based on the user's prompt. A label of a product, for instance, is adapted in some embodiments to reflect the prompt of a user.

In some embodiments, a portion of a product such as a design on a t-shirt, mug, or keychain can incorporate an AI-generated image. In some embodiments, users are provided with an opportunity to purchase the product, which may be printed on demand.

In some embodiments, AI (based on a user's prompt or otherwise) is used to extrapolate the area around an image or video. For example, AI can be used to switch the orientation of a vertical phone video to a horizontal phone video by filling in content that it calculates to lie on the sides of the frame. The video can take into account sound received from outside the frame of the video to fill in the missing information.

While the foregoing highlights some of the functionality of the present systems and methods, a more detailed discussion of the structure of embodiments is now discussed.

Figure 7:
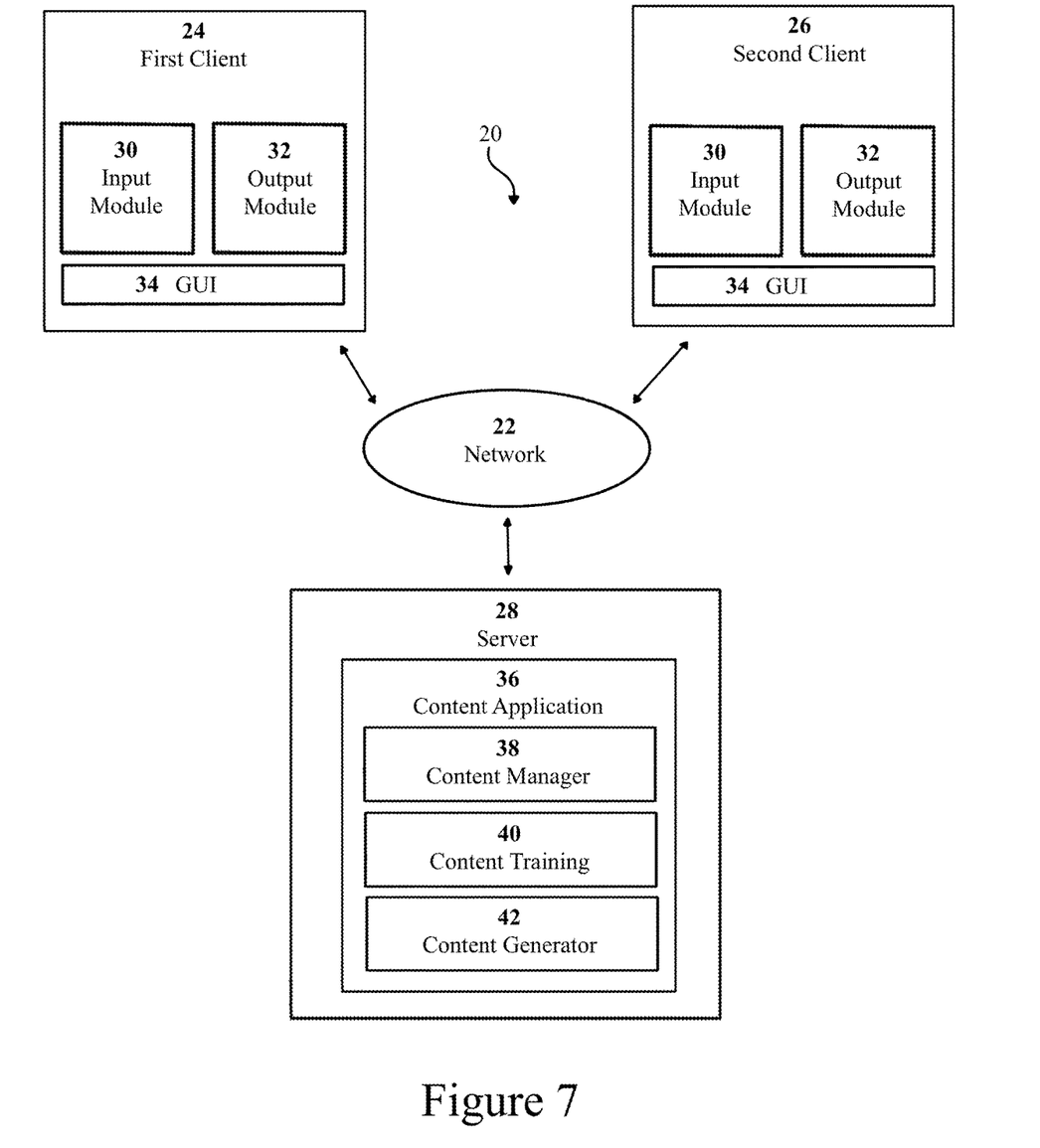
FIG. 7 illustrates a diagram representing various components of an AI system, in accordance with representative embodiments.

As shown in FIG. 7, some embodiments of the present invention include an artificial-intelligence-based content generation system 20 adapted for advertising. Some embodiments include a network 22 (which may include any suitable network, including an internet network, an internal network, a cloud-based network, a server network, or any other network) connecting a first client 24 and a second client 26 to a server 28. In some embodiments, the first client 24 includes a user client (e.g., a user's computer, computer system, terminal, smart phone, or other client system), and the second client 26 includes an advertiser client (e.g., an advertiser's computer, computer system, terminal, smart phone, or other client system). The network 22 can connect the first client 24 and the second client 26 to the server 28 simultaneously or sequentially, as desired.

In some embodiments, one or both of the clients 24, 26 include one or more input modules 30, output modules 32, and GUIs 34. As discussed above, input modules 30 can include any component allowing the system 20 to receive input from a user or an advertiser. That said, in some embodiments, the input module 30 of the second client 26 includes additional functionality allowing an advertiser to provide additional instructions or customization. Output modules can include any modules configured to allow a user or an advertiser to receive output (whether for use or for mere experimentation and preview). The GUIs 34 can include any components configured to allow a user or advertiser to interact with the modules 30, 32 or the server 28. By way of non-limiting illustrations, the GUIs 34 can include one or more windows, graphics, instructions, virtual buttons (or sliders, dials, or other interactive features), displayed settings, and other similar features.

In some embodiments, the server 28 includes (e.g., has installed thereon) one or more content applications 36 configured to receive input from one or both of the clients 24, 26 and provide output to one or both of the clients 24, 26. Some embodiments of the content application 36 include one or more content managers 38 (configured to receive and process the input from both clients and forward instructions for content generation based on such input, or to perform any of the other content management functions discussed herein), content training 40 (configured to cause the content application 36 to produce the desired content), and one or more content generators 42 (configured to process the instructions from the content manager 38 in accordance with the content training 40 to produce the desired generated content).

Further details relating to the content application 36 and its constituent components are set forth below:

Some implementations of the system 20 implement various kinds of diffusion model ("DMs"). Some types of diffusion models are latent diffusion models ("LDMs"). DMs are typically trained with the objective of removing successive applications of Gaussian noise on training images which can be thought of as a sequence of denoising autoencoders. In some embodiments of the invention, images (such as advertisements) are encoded, transposing them into noise resembling gaussian noise.

Some embodiments of the content application 36 have multiple software components, such as one or more variational autoencoders ("VAE"), one or more U-Nets, or one or more text encoders.

In some embodiments, a VAE compresses an image from pixel space to a smaller dimensional latent space, capturing a more fundamental semantic meaning of the image. In some embodiments, Gaussian noise is iteratively applied to the compressed latent representation during forward diffusion. Some embodiments of the present systems and methods are configured to substitute certain content, such as an advertisement, for all or a portion of the noise. For example, an image may include an advertisement configured to change only partially in response to a prompt (e.g., a packaging design of the product changes in response to the prompt). In some such cases, the model is configured to generate noise (e.g., convert a portion of an image to noise) in only the portion of the image intended to be modified by the prompt (and, in some cases, to apply denoising only to the noisy portion).

In some embodiments, a U-Net block may include a backbone (such as a ResNet backbone or any other suitable backbone). In some embodiments, the U-net block denoises the output from forward diffusion backwards to obtain a latent representation. Subsequently, the VAE may generate an image by converting the representation back into pixel space.

According to some embodiments, the U-net comprises one or more encoder paths and one or more decoder paths. In some embodiments, the encoder path reduces the spatial dimensions of an input image (e.g., through a series of convolutional and pooling layers), while capturing high-level features. In some embodiments, the decoder path then performs an upsampling of these high-level features to reconstruct the original spatial dimensions of the input image. Some embodiments of the present systems include a first encoder path for user input and a second encoder path for advertisement input. In some embodiments, the two (or more) streams of input are combined once encoded. In some cases, the input is then decoded through a single decoder path. Conversely, in some cases, an image is encoded using only a single encoder path, and then decoded using a first decoder path (e.g., for generating content requested by a user) and a second decoder path (e.g., for generating content requested by an advertiser). Some embodiments implement the aforementioned techniques in a more complex manner, integrating a combination of multiple encoder paths and decoder paths to influence the generation of the intended result (including any combination of advertiser-requested and user-requested content, as described herein).

In some embodiments, as part of the encoder path, an input image is passed through a series of convolutional layers with rectified linear unit (ReLU) activations, which extract features at different levels of abstraction. In some embodiments, one or more of the convolutional layers are configured to extract particular features identified as important to preserve (e.g., as identified based on instructions provided by an advertiser or a user). In some embodiments, after each convolutional layer, a max-pooling layer is applied to reduce the spatial dimensions of the feature maps while preserving the most important information (which, in some cases, is determined based on instructions provided by a user or advertiser).

In some embodiments, the decoder path is configured to implement concatenation to combine feature maps. As an example, features maps from the encoder path can be concatenated with those from the decoder path, allowing the system to make use of both low-level and high-level features for segmentation. As another example, feature maps relating to user input and feature maps relating to advertiser input can be concatenated (in whole or in part) to produce the desired output.

In some embodiments, the U-Net architecture is configured to utilize skip connections to provide a shortcut for gradient flow during training, enabling the network to better preserve spatial information and capture fine details.

Input (including user input and other input, such as advertiser input or predetermined input) may be collected at any suitable stage. For example, input may be provided (or applied) during the denoising step, which can be flexibly conditioned on a string of text, an image, or another modality (for example, an advertisement or set of advertisements). In some embodiments, the model is configured to apply the input to all or a portion of the noise, biasing the denoising toward generating a particular image based on the input. In some embodiments, multiple strings of input are applied to the denoising (e.g., user input and advertising input) to create an image having aspects determined by each source of input. Accordingly, in some cases, the model or a portion thereof (e.g., a particular module) is configured to receive, process, and apply multiple pieces of input, either simultaneously or sequentially. Input can include text, images, audio, other input, or a mixture of different input types. In some cases, a first input may include text, while a second input includes an image.

In some embodiments, the encoded conditioning data is exposed to denoising U-Nets via a cross-attention mechanism. For conditioning on text, a fixed, pretrained encoder (e.g., a CLIP ViT-L/14 text encoder) may be used to transform text prompts to an embedding space. In some embodiments, the text encoder has different instructions or training for different inputs (e.g., a first training module for inputs received from a user, and a second training module for inputs received from advertisers).

In some embodiments, the content application 36 includes content training 40, in which its content training capabilities are trained on training data, such as text, images, videos, music, captions, artwork, books, articles, and other materials. For example, the system may be trained on images scraped from the web and available in various databases or datasets. In some embodiments of the invention, specific advertisements or materials provided by an advertiser are included in training data (this can reduce the likelihood of generating an unappealing advertisement). In some embodiments, AI-generated advertisements are evaluated (e.g., through additional functionality of the AI system) to determine an appeal score. Advertisements with an appeal score below a certain threshold are regenerated or are not shown to users.

In some embodiments, one or more GPUs are included in the system 20 and used to train the system. As examples, Nvidia A100 GPUs, RTX A6000 GPUs, or any other suitable GPUs may be used.

Although any of the embodiments herein can apply to generation of images, they can also apply to generations of text. Additionally, in some embodiments, text and images may be cogenerated in order to form a stronger advertisement.

In some implementations, end-users may implement additional training to fine-tune generation outputs to match more specific use-cases. For example, users can provide their own images, allowing the model to generate visually similar images. In some embodiments, materials provided by the user are evaluated by the AI system and used to determine more effective advertisements to present to the user. In some embodiments, the materials provided by the user are modified to integrate one or more advertisements.

In some embodiments, the AI system includes a hypernetwork (e.g., a small pre-trained neural network that is applied to various points within a larger neural network). In some embodiments, the hypernetwork includes advertisements to be presented to users through any suitable method. Hypernetworks may steer results towards a particular direction, thereby encouraging generated materials to imitate the art style or content of a specific advertisement, even if the advertisements are not recognized by the original model.

In some embodiments, the content manager 38 implements methods that include processing an image by finding key areas of importance (e.g., labels, blank wall space, other suitable image elements), and then patching these areas in secondary latent space to generate a desired outcome (e.g., an advertisement embedded in an image generated with guidance from a user prompt).

In some embodiments, the system 20 (e.g., the content application 36) implements a deep learning generation model (e.g., as part of the content manager 38, content training 40, or content generator 42, or a combination of all or some of the foregoing) in order to fine-tune the model to generate precise, personalized outputs that depict a specific subject (e.g., an advertisement) following training via a set of images which depict the subject.

In some embodiments, the system has the ability to generate new images from scratch through the use of a text prompt describing elements to be included or omitted from the output. In some embodiments, existing images can be re-drawn by the model to incorporate new elements described by a text prompt through a diffusion-denoising mechanism. In some embodiments, a prompt is provided by the system when the system is instructed to show an advertisement to a user—the prompt may then be used to alter an image generated for the user in order to display an advertisement incorporating elements of the generated image, or to display a generated image incorporating elements of the advertisement. In some embodiments, various prompts (e.g., supplied by advertisers, generated by the model, or obtained from any other suitable source) may be used to automatically partially alter existing images via inpainting and outpainting.

In some implementations, the AI system is configured to identify potential competitors of the targeted advertisement and alter a prompt to exclude material that could be seen as promoting competitors. For example, a prompt for "a delicious Taco" accompanied by text promoting a particular taco restaurant could be automatically modified to include the additional instructions "no hamburger". This can be used to eliminate specific elements (e.g., particular objects, particular positioning of objects, or other details) or general elements (e.g., particular shapes, colors, art styles, or other general elements).

In some implementations, generated images containing advertisements are tagged with a watermark to allow users to identify an image as (1) containing an advertisement; or (2) containing AI-generated content; or (3) containing an AI-generated advertisement. In some embodiments, the watermark is invisible or digital, and in some embodiments the water mark is clearly visible. In some embodiments, the watermark is not placed on the image itself, but is displayed near or superimposed over the image.

In some embodiments, an advertiser is presented with the opportunity to select how closely a generated image will adhere to a prompt or image provided by the advertiser. Thus, advertisements may be more blatant or more subtle.

While the advertisements displayed to users may be presented in the same manner as any other output provided to users, in some embodiments advertisements are displayed or presented on a separate portion of a screen, webpage, user interface, or other mode of output. For example, in some embodiments, one or more advertisements is displayed on a portion of a screen. When a user enters a prompt, the advertisements are modified based on the prompt provided. In some embodiments, the modification may be slight, while in others it may be drastic. As a non-limiting example, one advertisement may display a taco, while another may display a product in a package. In response to a user providing the prompt "a frog", in addition to normal AI-generation of an image of a frog, the taco advertisement may be modified to show a frog eating a taco. The product in a package may be modified to show a frog on the packaging. Any other suitable modification may also be effected.

In some implementations, different weights are prescribed to different portions of an advertisement. For example, a taco may be given a weight of 1, whereas a drink accompanying the taco may be given a weight of 0.5. Thus, the AI system will prioritize including a taco in the generated output, and many instances will be likely to include a drink as well.

In some implementations, the system is configured to track engagement with advertisements (e.g., clicks, time spent viewing, purchases, etc.). In some embodiments, the system adapts to provide advertisements that are likely to receive more engagement. In some embodiments, the engagement of a particular user is incorporated into the system to provide advertisements with features specifically calculated to elicit more engagement from the user. In some embodiments, data is aggregated to create advertisements more likely to appeal to many users.

In some embodiments, inpainting is used to incorporate an advertisement into input provided by a user or into an image generated in response to a user's prompt. In some embodiments, inpainting is used to incorporate the user's input or an image generated in response to a user's prompt into an advertisement. Generally speaking, inpainting may involve selectively modifying a portion of an existing image delineated by a layer mask (e.g., a layer mask provided by the user, by an advertiser, or automatically created by the system), which fills the masked space with newly generated content based on the provided prompt or data provided by an advertiser (or generated by the system). Outpainting may also be used in similar manners, which may extend an image beyond its original dimensions, filling the previously empty space with content generated based on information provided by an advertiser, by a user prompt, or a combination of both.

In some embodiments, advertising elements to be incorporated into images (or text) include brand names and logos. For example, a generated shirt in an image could be instructed to include the logo of an advertising clothing company.

Advertising can be applied to a variety of AI-related tasks, including image denoising, inpainting, super-resolution, and image generation.

Some embodiments of the systems described herein include one or more user interfaces. In this regard, while a single user interface may suffice (in some cases) for both advertisers and users, in some embodiments advertisers and users are presented with separate user interfaces.

Accordingly, in some embodiments, the advertiser can configure elements of the system for presenting advertisements to the user by using the advertising user interface, whereas the user's user interface may omit elements used to configure the advertisement. Examples of attributes that can be adjusted in the advertiser's user interface can include the following: specific prompt input to be integrated with a user's input; instructions relating to display of the advertisement; position of the advertisement; portion of the advertisement to be modified using the user's input; size or other parameters of the advertisement; or any other attribute of the advertisement as described herein.

The invention is not limited to images. Wherever images are mentioned in the specification, text, videos, music, or any other content of any kind may be substituted, and any content is interchangeable with any other content for the purposes of this disclosure.

Any and all of the components in the figures, embodiments, implementations, instances, cases, methods, applications, iterations, and other parts of this disclosure can be combined in any suitable manner. Additionally, any component can be removed, separated from other components, modified with or without modification of like components, or otherwise altered together or separately from anything else disclosed herein. As used herein, the singular forms "a", "an", "the" and other singular references include plural referents, and plural references include the singular, unless the context clearly dictates otherwise. For example, reference to a user interface includes reference to one or more user interfaces, and reference to processors includes reference to one or more processors. In addition, where reference is made to a list of elements (e.g., elements a, b, and c), such reference is intended to include any one of the listed elements by itself, any combination of less than all of the listed elements, and/or a combination of all of the listed elements. Moreover, the term "or" by itself is not exclusive (and therefore may be interpreted to mean "and/or") unless the context clearly dictates otherwise. Furthermore, the terms "including", "having", "such as", "for example", "e.g.", and any similar terms are not intended to limit the disclosure, and may be interpreted as being followed by the words "without limitation".

The described systems and methods may be embodied in other specific forms without departing from their spirit or essential characteristics. The described embodiments, examples, and illustrations are to be considered in all respects only as illustrative and not restrictive. The scope of the described systems and methods is, therefore, indicated by the appended claims rather than by the foregoing description. All changes that come within the meaning and range of equivalency of the claims are to be embraced within their scope. Moreover, any component and characteristic from any embodiments, examples, and illustrations set forth herein can be combined in any suitable manner with any other components or characteristics from one or more other embodiments, examples, and illustrations described herein.

What is claimed is:

1. An artificial intelligence system configured to generate content, the artificial intelligence system comprising:
    a first client;
    a second client;
    a server; and
    a network,
    wherein each of the first client and the second client is operatively connected to the server via the network,
    wherein the server comprises a content application comprising:
        a content manager configured to receive a first input from the first client and a second input from the second client and form generation instructions based on the first input and the second input; and
        a content generator configured to receive the generation instructions from the content manager and generate output based on the generation instructions, the content generator comprising a diffusion model, which comprises:
        a U-Net; and
        a variational autoencoder,
    wherein the diffusion model is configured to generate a first image in response to the first input received from the first client by generating gaussian noise, processing the gaussian noise using the U-Net to denoise the gaussian noise to obtain a latent representation incorporating the first input, and processing the latent representation using the variational autoencoder to convert the latent representation into pixel space, thereby producing the first image; and wherein the diffusion model is configured to generate a second image by converting a portion of the first image back to gaussian noise, applying denoising to the portion using the U-Net to obtain a second latent representation incorporating the second input, processing the second latent representation using the variational autoencoder to produce the second image, and concatenating the second image to combine a feature map of the first image with a feature map of the second image.

2. The artificial intelligence system of claim 1, wherein the first client comprises a first input module, a first output module, and a first GUI.

3. The artificial intelligence system of claim 2, wherein the second client comprises a second input module, a second output module, and a second GUI.

4. The artificial intelligence system of claim 3, wherein the second input module comprises expanded input functionality that the first input module lacks.

5. The artificial intelligence system of claim 4, wherein the expanded input functionality includes settings relating to priority of the first input and the second input during image generation.

* * * * *